United States Patent
Kraus et al.

(10) Patent No.: US 9,510,509 B2
(45) Date of Patent: Dec. 6, 2016

(54) TWO-STAGE HARVESTING SYSTEM

(75) Inventors: Timothy J Kraus, Blakesburg, IA (US); Jeremy M Erdmann, Floris, IA (US)

(73) Assignee: DEERE & COMPANY, Moline, IL (US)

( * ) Notice: Subject to any disclaimer, the term of this patent is extended or adjusted under 35 U.S.C. 154(b) by 355 days.

(21) Appl. No.: 13/601,415

(22) Filed: Aug. 31, 2012

(65) Prior Publication Data

US 2014/0059992 A1    Mar. 6, 2014

(51) Int. Cl.
*A01D 34/00* (2006.01)
*A01D 43/00* (2006.01)
*A01D 45/00* (2006.01)
*A01D 91/04* (2006.01)

(52) U.S. Cl.
CPC .............. *A01D 43/00* (2013.01); *A01D 45/00* (2013.01); *A01D 91/04* (2013.01)

(58) Field of Classification Search
CPC ...... A01D 45/00; A01D 45/16; A01D 43/00; A01D 91/04
USPC ...................... 56/13.5, 53, 56, 14.5, 192, 126
See application file for complete search history.

(56) References Cited

U.S. PATENT DOCUMENTS

| | | | |
|---|---|---|---|
| 3,178,871 A | | 4/1965 | Nothnagel |
| 3,298,162 A * | | 1/1967 | Medd .............................. 56/13.9 |
| 3,492,796 A * | | 2/1970 | Lundell ............................... 56/1 |
| 3,638,406 A * | | 2/1972 | Scherer et al. ................. 56/14.9 |
| 4,042,132 A * | | 8/1977 | Bohman et al. ............... 414/335 |
| 4,115,984 A * | | 9/1978 | Simpson ......................... 56/13.5 |
| 4,183,471 A | | 1/1980 | Pfister |
| 4,376,609 A * | | 3/1983 | Bohman et al. ............... 414/335 |
| 5,557,859 A * | | 9/1996 | Baron .............................. 34/378 |
| 5,941,768 A * | | 8/1999 | Flamme ......................... 460/114 |
| 6,682,416 B2 * | | 1/2004 | Behnke et al. ................ 460/114 |
| 7,337,023 B2 * | | 2/2008 | Diekhans ......................... 700/52 |
| 7,509,785 B2 * | | 3/2009 | Fukumori et al. ............... 53/211 |
| 7,721,516 B2 * | | 5/2010 | Wendling ................... 56/10.2 A |
| 7,818,954 B2 * | | 10/2010 | Rempe et al. .................. 56/341 |
| 8,132,397 B2 * | | 3/2012 | Shields ........................... 56/341 |
| 8,180,534 B2 * | | 5/2012 | Burke et al. .................... 701/50 |
| 8,443,580 B2 * | | 5/2013 | Matousek et al. ............... 56/341 |
| 8,464,508 B2 * | | 6/2013 | Matousek et al. ............... 56/341 |
| 2003/0093979 A1 * | | 5/2003 | Fukumori et al. ............... 53/587 |
| 2005/0126150 A1 | | 6/2005 | Talbott et al. |
| 2009/0019826 A1 | | 1/2009 | Rigney |

(Continued)

FOREIGN PATENT DOCUMENTS

| | | |
|---|---|---|
| DE | 2819101 A1 | 11/1979 |
| DE | 3317568 A1 | 12/1983 |
| FR | 1270071 A1 | 8/1961 |

(Continued)

OTHER PUBLICATIONS

European Search Report, dated Oct. 30, 2013 (5 pages).

*Primary Examiner* — Robert Pezzuto
*Assistant Examiner* — Joan D Misa

(57) ABSTRACT

A two-stage harvesting system including a first stage harvesting apparatus and a second stage harvesting apparatus. The first stage harvesting apparatus takes a first crop portion from an agricultural crop leaving a second crop portion in a field. The second stage harvesting apparatus takes the second crop portion. The first stage harvesting apparatus and the second stage harvesting apparatus are connected together.

12 Claims, 2 Drawing Sheets

(56) References Cited

U.S. PATENT DOCUMENTS

2013/0074465 A1* 3/2013 Ardison et al. ............... 56/13.5
2013/0337524 A1* 12/2013 Schany et al. ............... 435/165

FOREIGN PATENT DOCUMENTS

| FR | 2744874 A1 | 8/1997 |
| WO | 2006031174 A1 | 3/2006 |

* cited by examiner

TWO-STAGE HARVESTING SYSTEM

FIELD OF THE INVENTION

The present invention relates to an agricultural harvesting system, and, more particularly, to a harvesting system that harvests two separate aspects of an agricultural crop.

BACKGROUND OF THE INVENTION

The terms "hay" and "forage" refer to the leaves and stems of plants that is fed to animals. The plants may be herbaceous, legumes or grasses that are harvested and processed for immediate feeding or stored for feeding during the time that the plants are not producing biomass. The processing of the plants into hay typically involve the processes of cutting the crop, perhaps conditioning the crop by distressing particularly the stems to promote drying, windrowing, baling, and the gathering and transporting of the crop to a storage/feeding facility.

From U.S. Pat. No. 4,183,471, it can be understood that it is often desirable to separate the leaves from the stems of fibrous plants such as alfalfa. The value of separating the leaves is that the leaves are, relatively speaking, very high in protein while the stems are essentially a bulk material with lesser protein and nutrient value. By separating these components of the plant, then the plant components can be optimally stored and processed. When it is time for feeding the animals the components that will most efficiently provide the nutrients to a particular class of livestock can be mixed from the components to meet the needs of the animals. For example, for milk cows a higher mix of leaves may be supplied for more concentrated protein to optimize milk production, while juvenile cattle may get a higher bulk feed containing relatively more stem material.

In order to separate the stems from the leaves the above noted patent utilized a separating technique that was applied to hay, which contained the mixture of stems and leaves. Newer techniques include an in-line alfalfa leaf stripper that is a self-propelled device that cuts and strips the leaves from the stems as an integrated unit. The leaves are then blown into a separate container and the stems are placed on the ground for later baling. Problems with such an interated system include that the system itself is complicated, expensive and is plagued with crop flow issues.

In US patent application 2005/0125150, a crop stripping apparatus is disclosed and the method includes the stripping of leaves in a first pass and the later handling of the remaining stems with a forage harvester in a second pass, which may take place even the same day.

What is needed in the art is a simple, cast-effective and efficient way of separating the leaves from the stems in the field in a single pass.

SUMMARY

The present invention provides for a two-stage harvesting system for crops.

The invention in one form is directed to a two-stage harvesting system including a first stage harvesting apparatus and a second stage harvesting apparatus. The first stage harvesting apparatus takes a first crop portion from an agricultural crop leaving second crop portion in a field. The second stage harvesting apparatus takes the second crop portion. The first stage harvesting apparatus and the second stage harvesting apparatus are connected together.

The invention in another form is directed to a two-stage harvesting system including an agricultural power unit, a first stage harvesting apparatus and a second stage harvesting apparatus. The first stage harvesting apparatus taking a first crop portion from an agricultural crop leaving a second crop portion in a field. The first stage harvesting apparatus being powered by the agricultural power unit. The second stage harvesting apparatus taking the second crop portion from the field. The first stage harvesting apparatus and the second stage harvesting apparatus being detachably connected to the agricultural power unit.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION

Figure 1:
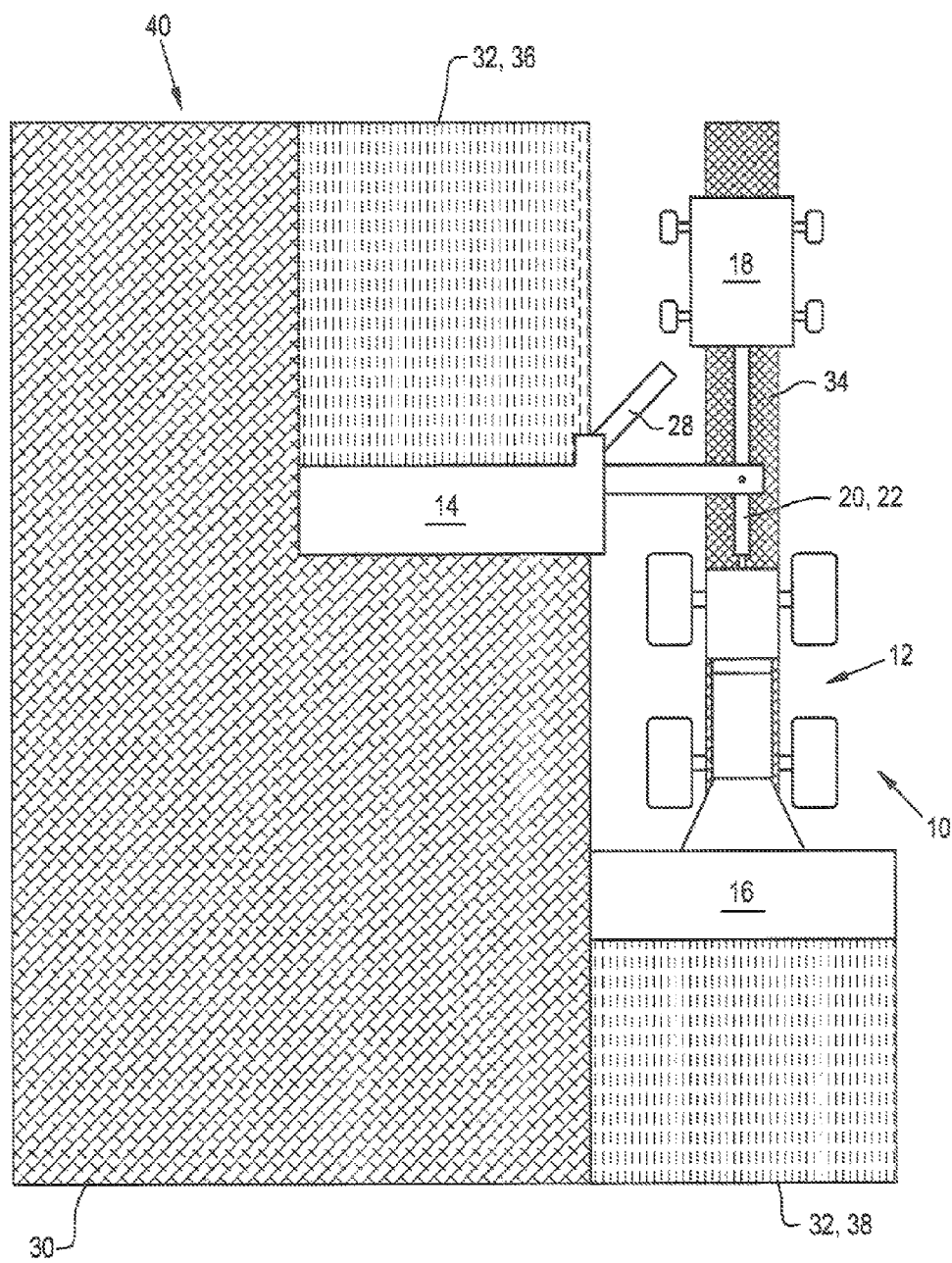
FIG. 1 is a schematical top view of an embodiment of a two stage harvesting system of the present invention.
Figure 2:
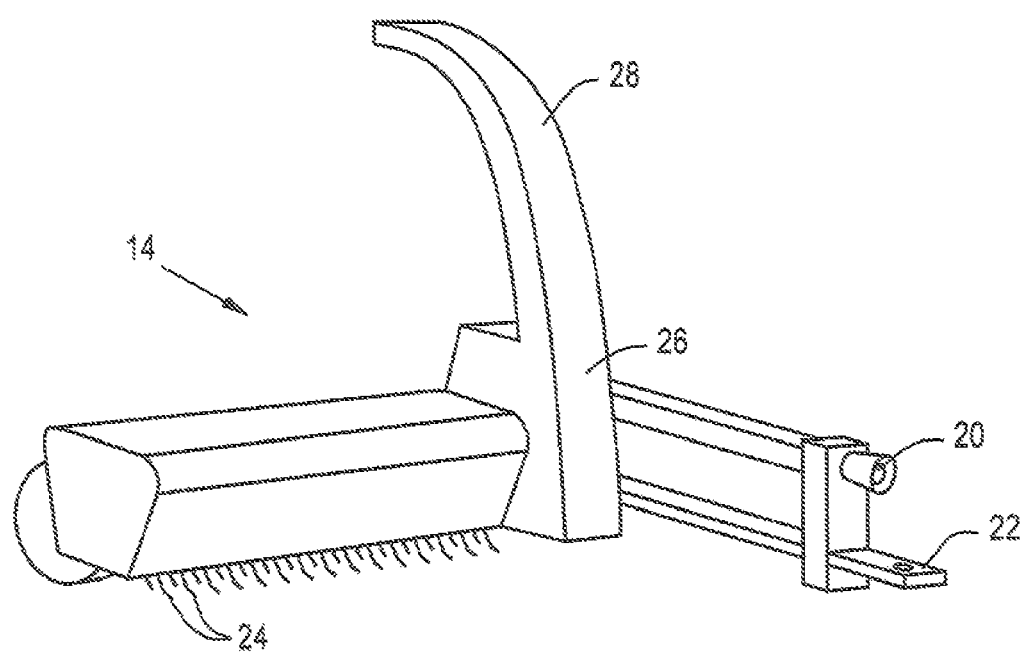
FIG. 2 is a schematical perspective view of an embodiment of a leaf stripping harvester used in the two stage harvesting system of FIG. 1.

Referring now to the drawings, and more particularly to FIGS. 1 and 2, there is illustrated a two-stage harvesting system 10 including an agricultural power unit 12, a first stage harvesting apparatus 14, a second stage harvesting apparatus 15 and a towed container 18. Agricultural power unit 12 is illustrated here as a tractor having a front mounted second stage harvesting apparatus 16 attached thereto.

First stage harvesting apparatus 14 is a leaf stripping apparatus and includes a power take off connection 20, a hitch 22, tines 24 a blower 26 and a chute 28. First stage harvesting apparatus 14 is shown here as being towed by agricultural power unit 12 by way of hitch 22 connected to agricultural power unit 12. Power is transferred from agricultural power unit 12 to first stage harvesting apparatus 14 by way of power take off connection 20. First stage harvesting apparatus 14 is similar to a flail chopper used to chop and blow a crop into a container. However, first stage harvesting apparatus 14 has tines 24 that are positioned where the flail would be in a chopper. Tines 24 serve to strip the leaves off of standing crop 30 leaving leaf stripped standing crop 32 in first swath 36 as two-stage harvesting system 10 proceeds in a forward direction.

As two-stage harvesting system 10 goes through a field 40, only a portion of which is shown in FIG. 1, first swath 36 is formed as first stage harvesting apparatus 14 strips the leaves from standing crop 30 leaving leaf stripped standing crop 32. As two-stage harvesting system 10 goes in a clockwise pattern first swath 36 becomes second swath 38 and second stage harvesting apparatus 14 encounters leaf stripped standing crop 32. Second stage harvesting, apparatus 14 cuts leaf stripped standing crop 32 and places the stem material in a window 34. The processing of standing crop 30 by first stage harvesting apparatus 14 in first swath 36 does cause the sterns to be scored and at least quasiconditioned by the rotation of times 24 to thereby allow a more rapid dehydration of the stems. When the leaf stripped standing crop 32 is cut by second stage harvesting apparatus 14 and placed into windrow 34 the stems may be harvested (typically as silage) after drying for only a few hours. It is also contemplated to have a further conditioner in second stage harvesting apparatus 14 to further crush the stems if such an action is necessary.

Advantageously, the configuration of two-stage harvesting system 10 allows or very little driving compression of the crop material before it is processed, perhaps only one wheel On first stage harvesting apparatus 14 may run over leaf stripped standing crop 32. Also, leaf stripped standing crop 32 is adjacent to second swath 38 allowing first stage harvesting apparatus 14 and second stage harvesting apparatus 14 to operate in nearly parallel operations. Although second stage harvesting apparatus 14 is illustrated as being displaced in a forward direction from first stage harvesting apparatus 14, and thus first stage harvesting apparatus 14 is behind second stage harvesting apparatus 14 in the forward moving direction, first stage harvesting apparatus 14 is a swath ahead of second stage harvesting apparatus 14 as the process proceeds in field 40.

Chute 28 of first stage harvesting apparatus 14 is moveable to thereby direct the leaves stripped from standing crop 30 to container 18, which is illustrated as a towed wagon. Container 18 may be a separate vehicle operating adjacent to first stage harvesting apparatus 14. Container 18 is configured to straddle windrow 34 to preclude damage to the stems in windrow 34. To open a field, the two-stage harvesting system 10 may first be operated in an opposite direction with just first stage harvesting apparatus 14 operating and then the direction reversed so that second stage harvesting apparatus 14 then encounters second swath 38 as first stage harvesting apparatus 14 is making first swath 36. First swath 36 is referred to as being first because it is created by the first encounter of standing crop 30 by two-stage harvesting system 10.

Advantageously, first stage harvesting apparatus 14 and second stage harvesting apparatus 14 are easily attachable/detachable, from agricultural power unit 12 to thereby reduce the number of power units needed around a farm. Another advantage is that both first stage harvesting apparatus 14 and second stage harvesting apparatus 14 operate virtually independent of each other relative to the crop flows to thereby have two separate crop flows which preclude the dual flow problems of the prior art. The configuration of Applicants' invention allows more room for both the cutting and the stripping mechanism to perform their separate functions. The single pass, two-swath approach having different operations occurring in the adjacent swaths allows for superior control of the functioning of each of the elements powered by agricultural power unit 12.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fail within the limits of the appended claims.

The invention claimed is:

1. A two-stage harvesting system, comprising:
   a first stage harvesting apparatus taking leaves from an agricultural crop leaving stems that are leaf stripped and standing in a field, the first stage harvesting apparatus powered by and detachably connected to the rear of an agricultural power unit; and
   a second stage harvesting apparatus taking said stems and placing them on a ground surface, said second stage harvesting apparatus being powered by and detachably connected to the front of the agricultural power unit, the two-stage harvesting system operates in a forward moving direction of the agricultural power unit, said first stage harvesting apparatus operating in a first swath adjacent to said second stage harvesting apparatus operating in a second swath.

2. The two-stage harvesting system of claim 1, further comprising an adjacent vehicle traveling in the second swath, wherein said leaves are directed thereto from said first stage harvesting apparatus.

3. The two-stage harvesting system of claim 1, further comprising a towed container wherein said leaves are directed thereto from said first stage harvesting apparatus, and wherein said towed container is towed in the second swath.

4. The two-stage harvesting system of claim 1, wherein said second stage harvesting apparatus removes said stems in a cutting manner and places said stems in a windrow.

5. The two-stage harvesting system of claim 4, wherein said leaves are removed from said stems in a non-cutting manner.

6. The two-stage harvesting system of claim 1, wherein the first stage harvesting apparatus at least partially conditions the stems that are leaf stripped and standing in a field.

7. A two-stage harvesting system, comprising:
   an agricultural power unit;
   a first stage harvesting apparatus taking leaves from an agricultural crop leaving stems that are leaf stripped and standing in a field, said first stage harvesting apparatus being powered by said agricultural power unit and being detachably connected to the rear of said agricultural power unit; and
   a second stage harvesting apparatus taking said stems and placing them on a ground surface, said second stage harvesting apparatus being detachably connected to the front of said agricultural power unit, said first stage harvesting apparatus operating in a first swath adjacent to said second stage harvesting apparatus operating in a second swath, said agricultural power unit traveling in a forward direction in said second swath.

8. The two-stage harvesting system of claim 7, further comprising an adjacent vehicle traveling in the second swath, wherein said leaves are directed thereto from said first stage harvesting apparatus.

9. The two-stage harvesting system of claim 7, further comprising a towed container detachably connected to the rear of the agricultural power unit, wherein said leaves are directed thereto from said first stage harvesting apparatus, and wherein said towed container is towed in the second swath.

10. The two-stage harvesting system of claim 7, wherein said second stage harvesting apparatus removes said stems in a cutting manner and places said stems in a windrow.

11. The two-stage harvesting system of claim 10, wherein said leaves are removed from said stems in a non-cutting manner.

12. The two-stage harvesting system of claim 7, wherein the first stage harvesting apparatus at least partially conditions the stems that are leaf stripped and standing in a field.

* * * * *